United States Patent [19]
Kobayashi et al.

[11] Patent Number: 5,390,028
[45] Date of Patent: Feb. 14, 1995

[54] APPARATUS FOR CONVERTING INPUT VIDEO SIGNAL TO MOTION PICTURE FILM IMAGE

[75] Inventors: Ikuo Kobayashi; Fumiaki Henmi, both of Kanagawa, Japan

[73] Assignee: Sony Corporation, Tokyo, Japan

[21] Appl. No.: 858,593

[22] Filed: Mar. 27, 1992

[30] Foreign Application Priority Data

Mar. 31, 1991 [JP] Japan .................. 3-092910

[51] Int. Cl.6 ............................................. H04N 5/87
[52] U.S. Cl. ................................... 358/346; 358/345
[58] Field of Search ............... 358/310, 335, 345, 346, 358/244, 332; 348/97; H04N 5/87

[56] References Cited

U.S. PATENT DOCUMENTS

| 4,344,088 | 8/1982 | Corsover et al. | |
| 4,473,849 | 9/1984 | Cool | 358/335 |
| 4,694,357 | 9/1987 | Rahman et al. | 358/335 |
| 4,794,460 | 12/1988 | Shiota | 358/244 |
| 5,016,101 | 5/1991 | Richards et al. | 358/346 |

FOREIGN PATENT DOCUMENTS 0395276 10/1990 European Pat. Off.

OTHER PUBLICATIONS

SMPTE Journal vol. 97, No. 10, Oct. 1988, Scarsdale N.Y. US pp. 833–843, XP48032 Thorpe et al. 'HDTV electron beam recording'.

Image Technology (Journal of the BKSTS) vol. 72, No. 1, Jan. 1990, London GB pp. 20–22, XP87202 KRSLJANIN 'Electron beam recorder the link between HDVS and film'.

*Primary Examiner*—Tommy P. Chin
*Assistant Examiner*—Huy Nguyen
*Attorney, Agent, or Firm*—William S. Frommer; Alvin Sinderbrand

[57] ABSTRACT

A picture signal converting apparatus converts a picture signal obtained from a video camera into a film recording signal. A color characteristic to be corrected and a corresponding correcting value are predetermined for each picture element of the picture signal. The picture signal is selectively color corrected with respect to the color represented by each picture element of the input picture signal. Color deterioration is effectively corrected so that the video signal is formed to match the color tone of the film.

8 Claims, 8 Drawing Sheets

APPARATUS FOR CONVERTING INPUT VIDEO SIGNAL TO MOTION PICTURE FILM IMAGE

BACKGROUND OF THE INVENTION

This invention relates to a picture signal converting device and is more particularly related to such a device used for converting a picture taken by a video camera into a movie film image.

An electron beam recorder (EBR) is a conventional picture signal converting device used for forming a picture taken by a video camera on a movie film.

Figure 1:
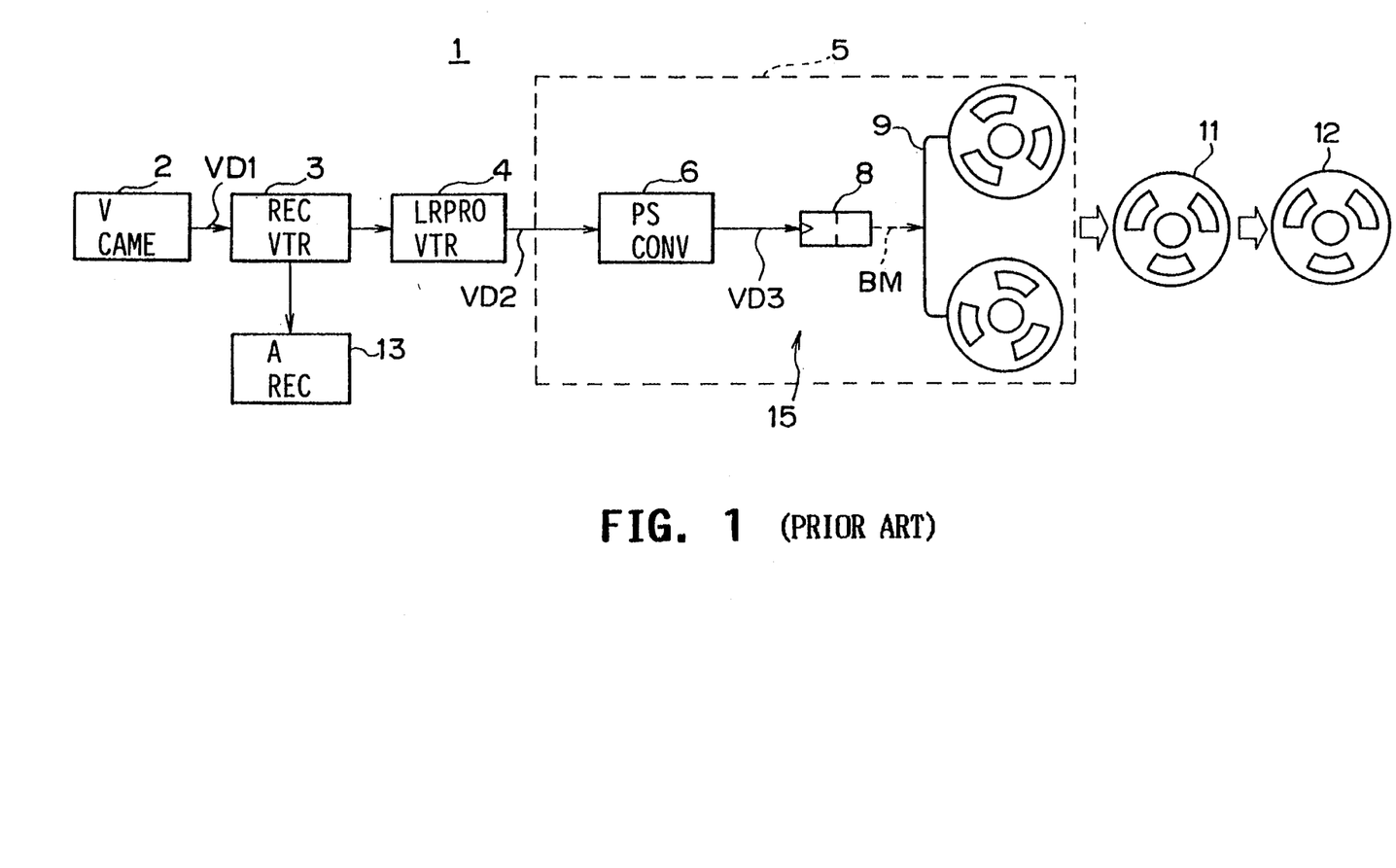
FIG. 1 is a block diagram depicting a conventional picture signal converting device.

Specifically, as illustrated in FIG. 1, a picture signal converting device 1 temporarily records a video picture signal VD1 obtained from a video camera 2 in a recording VTR 3 and thereafter slow-reproduces this signal by use of a subsequent slow reproducing VTR 4 to provide a low speed video signal VD2. The signal VD2 is then inputted to an EBR device 5.

The EBR device 5 includes a picture signal converting circuit 6 which performs predetermined signal processing on a video picture signal VD2. The picture signal converting circuit unit 6 generates a film recording signal VD3 by sequentially and intermittently outputting the red, green, and blue components of each frame of picture data. The signal VD3 is inputted to a beam gun 8 included in a subsequent EBR unit 15.

The beam gun 8 scans an electron beam BM on a black-and-white film 9 while modulating the intensity of the electron beam BM with the film recording signal VD3. Only the respective contrast of the color components in the film recording signal VD3 is formed on the black-and-white film 9.

Figure 2:
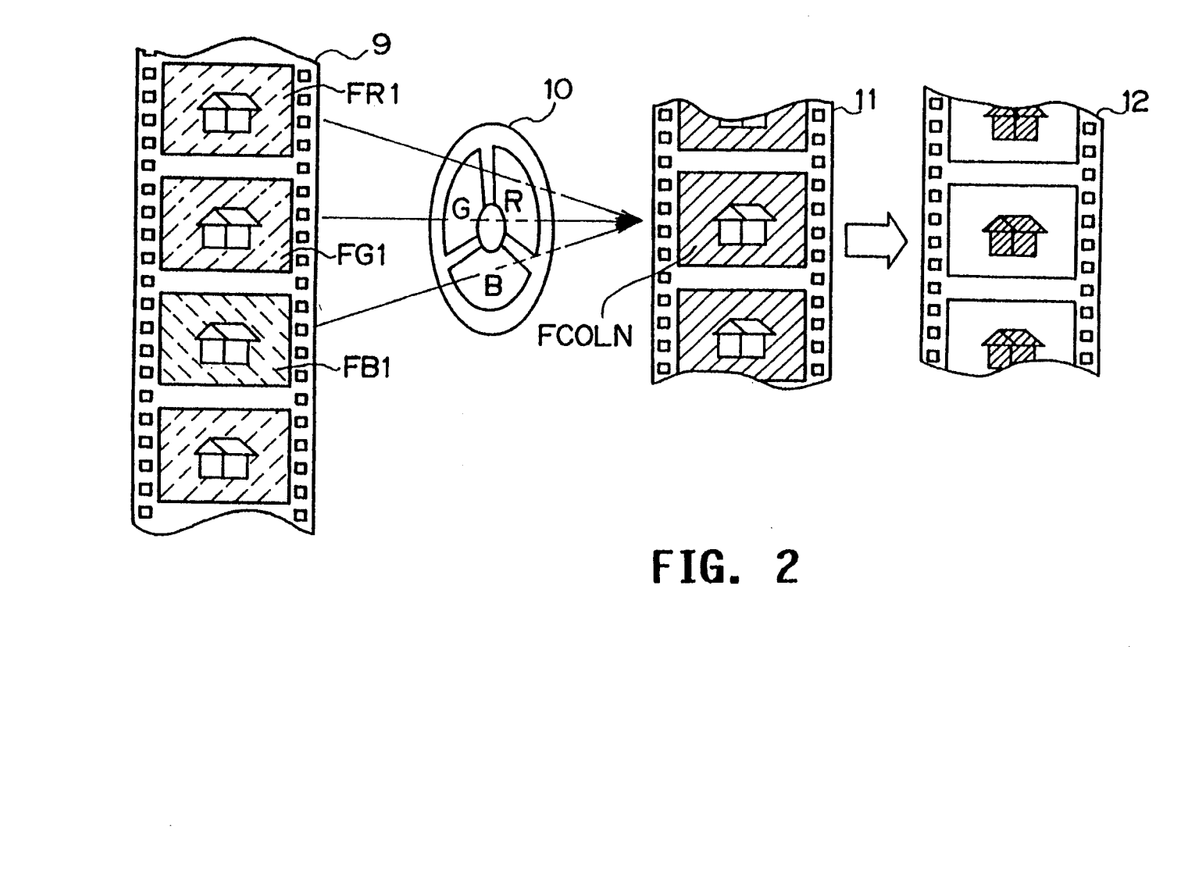
FIG. 2 is a schematic diagram used for explaining the conversion of a picture signal into a film image.

As illustrated in FIG. 2, the picture formed on the black-and-white film 9 is sequentially allocated to one frame for each of the red, green, and blue components of each frame of picture data intermittently outputted from the picture signal converting circuit unit 6.

In particular, the EBR unit 15 records the contrast of the red component of the film recording signal VD3 in a first recording area of the black-and-white film 9, thereby forming the contrast picture FR1 corresponding to the red component. The black-and-white film 9 is then fed forward by one frame and temporarily stopped. The contrast of the green component of the recording signal VD3 is recorded in a subsequent second recording area, thereby forming the contrast picture FG1 corresponding to the green component. The black-and-white film 9 is again fed forward by one frame and temporarily stopped. The contrast of the blue component of the recording signal VD3 is recorded in a subsequent third recording area, thereby forming the blue component picture FB1.

In this manner, the respective contrast pictures FR1, FG1, and FB1 for the red, green, and blue components of the reproducing picture outputted from the slow reproducing VTR 4 are sequentially formed in order on the black-and-white film 9.

Next, using the contrast pictures FR1, FG1, and FB1 of the respective primary color components which are formed on the black-and-white film 9, the red component contrast picture FR1 is recorded in a first recording area of a color negative film 11 through the red subfilter R of a filter 10, while the green component contrast picture FG1 is also recorded in the first recording area of the color negative film 11 through the green subfilter G of the filter 10, and the blue component contrast picture is also recorded in the first recording area of the color negative film 11 but through the blue subfilter B of the filter 10. A color negative picture FCOLN synthesized with the red, green, and blue components is thereby formed on the first recording area of the color negative film 11.

Finally, the picture of the color negative film 11 is transferred on to a color positive film 12, which is then usable as a movie film.

In this type of picture signal converting apparatus 1, the dynamic range from the black level to the white level of the video signal is narrower than the dynamic range of the film. Therefore, the red, green and blue components of the video signal which have a narrow dynamic range, are level converted using a gamma correcting circuit composed of a non-linear circuit, to spread the range from the black level to the white level and to match the video signal with the tone characteristics of the film. There is a problem with this type of processing in that the tone, chrominance and brightness of color of the pictures may change.

Conversion of the video signals with high-fidelity is especially difficult when the picture is monochromatic, because the color is darkened due to reduction of the chrominance and brightness.

The video picture signal VD1 outputted from the video camera also is corrected within the camera so as to match the gamma characteristic of the color phosphors of a CRT (cathode ray tube) so that a natural-appearing picture is displayed by the CRT from a video picture signal supplied directly from the camera (this correction being sometimes referred to as the "camera gamma characteristic"). The input picture provided for imaging by the video camera 2 is not linearly related to the picture signal outputted from the video camera.

In the picture signal converting apparatus 1 using an EBR unit, it is also necessary to correct the signal VD1 to match the gamma characteristic of the film on which the signal VD1 is to be recorded.

Therefore, in the picture signal converting circuit unit 6, the video picture signal VD2 is gamma corrected to match the gamma characteristic of the film.

This gamma correction is carried out by simultaneously correcting for the camera gamma characteristic and matching the gamma characteristic of the film. To do so, it is necessary to provide a correction curve that has both a correcting characteristic based on the camera gamma characteristic and a correcting characteristic based on the gamma characteristic of the film.

However, simultaneous correction with respect to both the camera gamma characteristic and the film gamma characteristic makes it complicated to provide a correcting characteristic which matches both the camera gamma characteristic and the film gamma characteristic. In addition, if either one of the video camera or the film is changed, the correcting characteristic must be redetermined. As a result, there are restrictions on selection of the video camera and the film.

Moreover, in the method described above in which a picture is formed on a black-and-white film 9 using an electron beam BM, the recording is performed by reducing the scanning speed of the electron beam BM to match the characteristics of the film so that the picture is formed with very high resolution.

Accordingly, a slow-reproduced picture is obtained by recording the video picture signals VD1 with the recording VTR 3 at a predetermined recording speed, reproducing the recorded signals with slow reproducing VTR 4 and repeatedly outputting the same frame thirty times per second. Then two repetitions are selected from the thirty repeated pictures and undergo timebase conversion, so that the speed is reduced down to the predetermined signal speed. The resulting film recording signals are used to form the picture with very high resolution on the black-and-white film 9.

Further, when the contrast pictures FR1, FG1, and FB1 for the respect primary color components are formed on the black-and-white film 9, the black-and-white film 9 is repeatedly stopped and fed. During this process, the red, green, and blue components of the film recording signals VD3 must be sequentially and intermittently transmitted.

As a result, the slow intermittent film recording signals VD3 can not be displayed using a monitor device adapted to receive normal video picture signals. To determine whether or not the picture signal converting device 1 is operating correctly and the desired picture is being formed on the film, it has been necessary to wait until the film was developed.

Specifically, in the EBR device 5 various kinds of signal processing such as color correction processing to correct color deviation of the video picture signal VD1, gamma processing to match gamma characteristics with the film characteristics, etc. are performed, and proper execution of these processes must be supervised. Detection of defects on the developed film, so that EBR recording must be re-effected, and other causes, have resulted in reduced operating efficiency.

In addition, during production of a movie film with editing by selecting predetermined scenes from the video picture signals VD1 for recording on the film, if the signals being recorded on the film can be directly monitored, the efficiency of the editing operation can be improved.

SUMMARY OF THE INVENTION

In view of the foregoing, an object of this invention is to provide a picture signal converting apparatus in which a picture signal is used to form a picture on a film while effectively preventing deterioration of the color.

Another object of this invention is to provide a picture signal converting apparatus in which gamma correction is facilitated.

A further objection of this invention is to provide a picture signal converting apparatus in which it is possible to directly monitor a picture to be recorded on a film.

According to an aspect of the invention, there is provided an apparatus for converting an input video signal having a nominal transmission speed into a motion picture film image, the apparatus including means for receiving the input video signal at the nominal transmission speed, converting the transmission speed of the video signal to a low speed that is lower than the nominal transmission speed, and transmitting the video signal at the low speed, color detecting means receiving the video signal transmitted at the low speed for detecting a color characteristic of the transmitted video signal and producing a detection signal on the basis of the detected color characteristic, correcting means receiving the video signal transmitted at the low speed and the detection signal produced by the color detecting means for performing color correction on the transmitted video signal on the basis of the detection signal to form a color corrected video signal, and gamma correcting means for performing gamma correction on the color corrected video signal on the basis of a gamma correction curve to perform a gamma corrected signal that is suitable for recording on motion picture film, wherein the correcting means predicts the gamma correction to be performed by the gamma correcting means and performs the color correction taking into account the predicted gamma correction.

According to another aspect of the invention, there is provided an apparatus for converting an input video signal having nominal transmission speed and provided from a video camera into a motion picture film image, the video camera having performed gamma correction on the input video signal by means of a nonlinear amplifier. According to this aspect of the invention, the apparatus includes means for receiving the input video signal at the nominal transmission speed, converting the transmission speed of the video signal to a low speed that is lower than the nominal transmission speed, and transmitting the video signal at the low speed, linearizing means receiving the video signal transmitted at the low speed for linearizing the transmitted video signal so as to reverse the gamma correction performed by the video camera, and gamma correcting means for correcting the linearized video signal on the basis of a gamma correction curve to form a signal that is suitable for recording on motion picture film.

According to a further aspect of the invention, there is provided an apparatus for converting an input video signal having a nominal transmission speed into a motion picture film image, the apparatus including means for receiving the input video signal at the nominal transmission speed, converting the transmission speed of the video signal to a low speed that is lower than the nominal transmission speed and transmitting the video signal at the low speed, the nominal speed being N times as fast as the low speed. According to this aspect, the apparatus also includes processing means receiving the video signal transmitted at the low speed for processing the transmitted video signal to form an output video signal that is suitable for recording on motion picture film, memory means for storing successive frames of the output video signal at the low speed, the memory means having first and second memory areas, and alternate ones of the successive frames being respectively stored in the first and second memory areas, read-out control means for controlling reading-out of the stored frames of the output video signal from the memory means so that the stored frames are read-out in a cycle in which each respective frame stored n the first and second memory areas is read-out N consecutive times at the nominal transmission speed, and a monitor for displaying the frames of the output video signal read-out from the memory means.

The nature, principle and utility of the invention will become more apparent from the following detailed description when read in conjunction with the accompanying drawings in which the parts are designated by like reference numerals or characters.

DETAILED DESCRIPTION OF THE INVENTION

Figure 3:
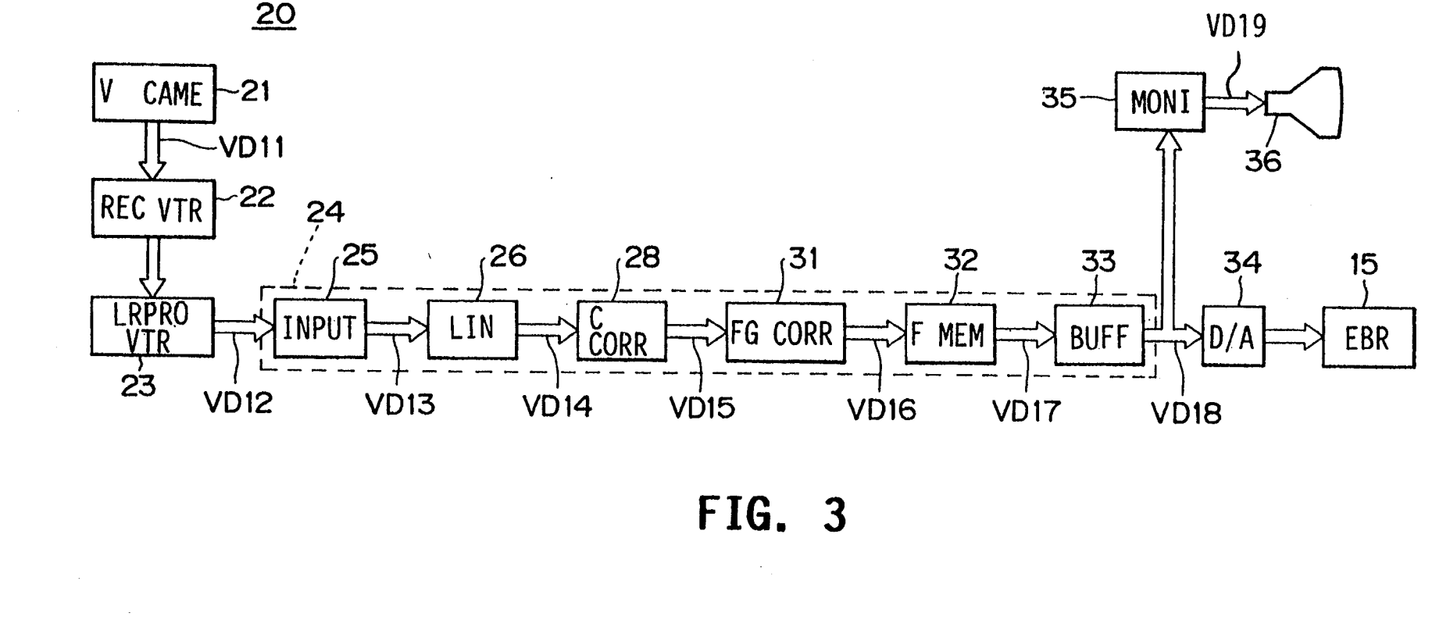
FIG. 3 is a block diagram showing an embodiment of a picture signal converting device according to the invention.

Preferred embodiments of this invention will now be described with reference to the accompanying drawings:

In FIG. 3, in which the portions corresponding to those of FIG. 1 are marked with the same reference numerals, a picture signal converting device 20 is an EBR device designed to form a high-definition digital video picture, taken by a video camera 21, on a movie film. The video picture signal VD11 obtained from the video camera 21 is temporarily recorded with a recording digital VTR 22. Video picture data VD12 are then provided from a slow-reproducing digital VTR 23 by converting the normal video signals VD11 consisting of continuous video data at 30 frames per second into slow pictures having a speed which is 1/30 of the normal speed and which are suited to the characteristics of a black-and-white film 9 (FIG. 2).

This conversion rate (1/30) is obtained by dividing the time allocated for each frame of the video signals VD11 by the time needed in the EBR unit 15 to record each frame of the video signals VD11 on the black-and-white film 9.

Figure 4:
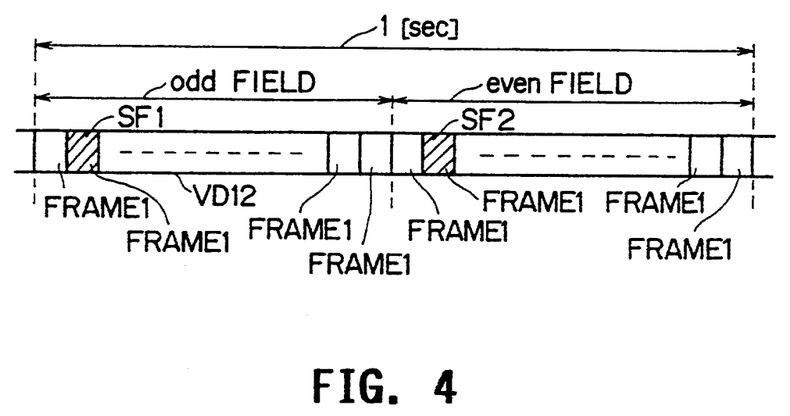
FIG. 4 is a schematic diagram illustrating formation of slow picture data in the device of FIG. 3.

For conversion into a slow picture, as illustrated in FIG. 4, the video picture data VD12 are comprised of 30 repetitions of the same frame during one second. The first 15 repeated pictures are allocated to an odd FIELD of the slow reproduced picture, while the latter 15 repeated pictures are allocated to an even FIELD of the slow reproduced picture, thus forming a single-frame still picture each second.

Thus, the repeated pictures used in forming the still picture are sequentially changed each second, thereby providing a slow reproducing picture in which the scene proceeds at intervals of one second.

The resulting video picture data VD12 are inputted to an input circuit 25 of a picture signal converting circuit unit 24. As illustrated in FIG. 4, one of the 15 repeated picture data constituting the odd FIELD is taken as a sample frame SF1. Meanwhile, one of the 15 frames of repeated picture data constituting the even FIELD is taken as a sample frame SF2. The film recording picture data for one frame of the slow reproduced picture is prepared using the sample frames SF1 and SF2.

In addition, the input circuit 25 reduces the clock frequency 74.25 MHz in this embodiment) to convert the video picture data VD12 down to a predetermined frequency conforming with the TTL/MOS hardware constituting the picture signal converting circuit unit 24. Also, the data are divided into red component data VDR, green component data VDG, and blue component data VDB in a predetermined digital matrix circuit.

The converted picture data VD13 obtained in this way are inputted to a linearizer 26, wherein gamma characteristics of the picture data as corrected by the video camera 21 are processed so as to restore the original characteristics of the image provided to the video camera 21.

More specifically, the linearizer 26 multiplies the input converted picture data VD13 by characteristics that are the reverse of gamma correction characteristics applied in the video camera 21, thus forming picture data corresponding to the picture originally inputted to the video camera 21.

In a ROM (read only memory), data sets presenting a number of reverse characteristics are stored in respective addresses in accordance with the types of camera in use. The particular data set corresponding to the video camera 21 is read out.

Picture data VD14 corrected based on the camera gamma characteristics of the video camera 21 is therefore inputted to a color correction circuit 28.

Because the picture data VD14 inputted for correction does not reflect the camera gamma characteristic in the color correction circuit 28, the color correction circuit 28 only needs to deal with the characteristics of the film. Color correction is effected by performing numerical computation with respect to the red component, the green component, and the blue component in order to match the color rendering characteristics of the relevant film.

Further, the color correction circuit 28 predicts respective changes in the red, green, and blue components of the picture data that will be brought about during gamma correction to be performed by a downstream gamma correcting circuit 31 based on the gamma characteristics of the film, and corrects the color components in advance, taking the predicted gamma correction into account.

Figure 5:
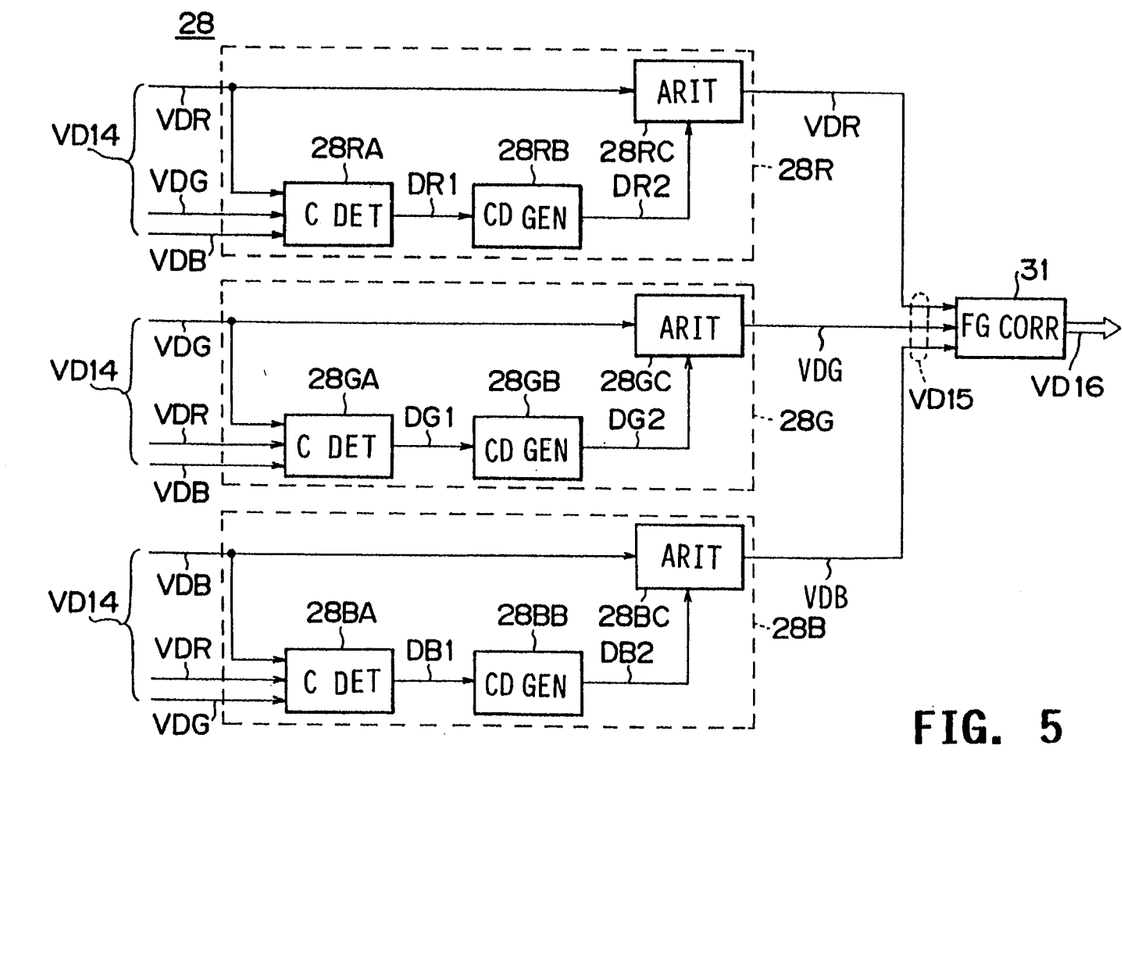
FIG. 5 is a block diagram depicting a color correction circuit that is part of the device of FIG. 3.

In particular, as depicted in FIG. 5, the color correction circuit 28 is composed of a red component correction circuit unit 28R for correcting the red component data VDR, a green component correction circuit unit 28G for correcting the green component data VDG, and a blue component correction circuit unit 28B for correcting blue component data VDB. In the red component correction circuit unit 28R, out of the picture data VD14 inputted to the color correction circuit 28, the 12 bits of data constituting the red component data VDR are inputted to an arithmetic circuit 28RC, while the 8 most significant bits of the red color data VDR are inputted to color determination circuit 28RA.

Concurrently, the color determination circuit 28RA is supplied with the three most significant bits of the green component data VDG and the three most significant bits of the blue component data VDB in the picture data VD14 inputted to the color correction circuit 28.

The data for the respective color components corresponding to more detailed representations of luminance, saturation, and hue are presented in the low-order bits. With respect to the red component data supplied to the color determination circuit 28RA, saturation groups are assigned based on the green and blue components.

The saturation groups represent categories as, e.g., achromatic colors, monochromatic colors, and medium colors or flesh colors. Further, degrees within each group are determined, and the corresponding determination information DR1 is inputted to a correction data generating circuit 28RB.

The correction data generating circuit 28RB outputs red color correction data DR2 according to the determination information DR1 inputted thereto and the arithmetic circuit 28RC adds (or multiplies) the red component data VDR with the correction data DR2.

If the picture data is a red, green, or blue monochrome the downstream film gamma correction circuit 31 will cause the picture data to decrease in saturation and luminance. Therefore, in this embodiment, if the color indicated by the picture data VD14 is a red monochrome according to the determination circuit 28RA, the correction data generating circuit 28RB outputs red correction data DR2 so that the luminance level and the saturation of the red component data VDR are increased.

By contrast, in the green component correction circuit unit 28G, out of the picture data VD14 inputted to the color correction circuit 28, the 12 bits of data constituting the green component data VDG are inputted to the arithmetic circuit 28GC, while the 8 most significant bits of the green component data VDG are inputted to the color determination circuit 28GA.

Concurrently, the color determination circuit 28GA is supplied with the three most significant bits of the red component data VDR and the three most significant bits of the blue component data VDR in the picture data VD14 inputted to the color correction circuit 28.

In the color determination circuit 28GA, the saturation groups for the green component data assigned are based on the red and blue components.

The saturation groups represent categories such as, e.g., achromatic colors, monochromatic colors, and medium colors or flesh colors. Further, degrees within each group are determined, and the corresponding determination information DR1 is inputted to a correction data generating circuit 28GB.

The correction data generating circuit 28GB outputs green color correction data DG2 according to the determination information DG1 inputted thereto and the arithmetic circuit 28GC adds (or multiplies) the green component data VDG with the correction data DG2.

If the color indicated by the picture data VD14 is a green monochrome according to the determination circuit 28GA, the correction data generating circuit 28GB outputs green correction data DG2 so that the luminance level and the saturation of the green component data VDG are increased.

On the other hand, in the blue component correction circuit unit 28B, out of the picture data VD14 inputted to the color correction circuit 28, the 12 bits of data constituting the blue component data VDB are inputted to the arithmetic circuit 28BC, while the 8 most significant bits of the blue component data VDB are inputted to the color determination circuit 28BA.

Concurrently, the color determination circuit 28BA is supplied with the three most significant bits of the red component data VDR and the three most significant bits of the green component data VDG in the picture data VD14 inputted to the color correction circuit 28.

In the color determination circuit 28BA, the saturation groups for the blue component data are assigned based on the red and green components.

The saturation groups represent categories such as, e.g., achromatic colors, monochromatic colors, and medium colors or flesh colors. Further, degrees within each group are determined, and the corresponding determination information DB1 is inputted to a correction data generating circuit 28BB.

The correction data generating circuit 28BB outputs the blue color correction data DB2 according to the determination information DB1 inputted thereto and the arithmetic circuit 28BC adds (or multiplies) the blue component data VDB with the correction data DB2.

If the color indicated by the pictured data VD14 is a blue monochrome according to the determination circuit 28BA, the correction data generating circuit 28BB outputs the blue correction data DB2 so that the luminance level and the saturation of the blue component data VDB are increased.

Thus, the picture data VD15 outputted from the color correction circuit 28 is already corrected with respect to the color component changes which will occur in the film gamma correction circuit 31.

The film gamma correction circuit 31 is a circuit for correcting the picture data in accordance with the density characteristics of the film. Since the intensity of the electron beam BM in the EBR unit 15 is to be modulated with the film recording data VD18 outputted from the picture signal converting circuit unit 24, the circuit 31 makes appropriate changes taking into account the density of the film.

The optimum correction characteristic curve for the film gamma correction circuit 31 can be selected depending on the film in use, the picture cut, the picture scene, etc.

Accordingly, a conversion table composed of RAM (random access memory) is employed in the film gamma correction circuit 31. Various correction characteristic curves can be stored in the RAM by an input computer according to the characteristics of the film, etc.

Figure 6:
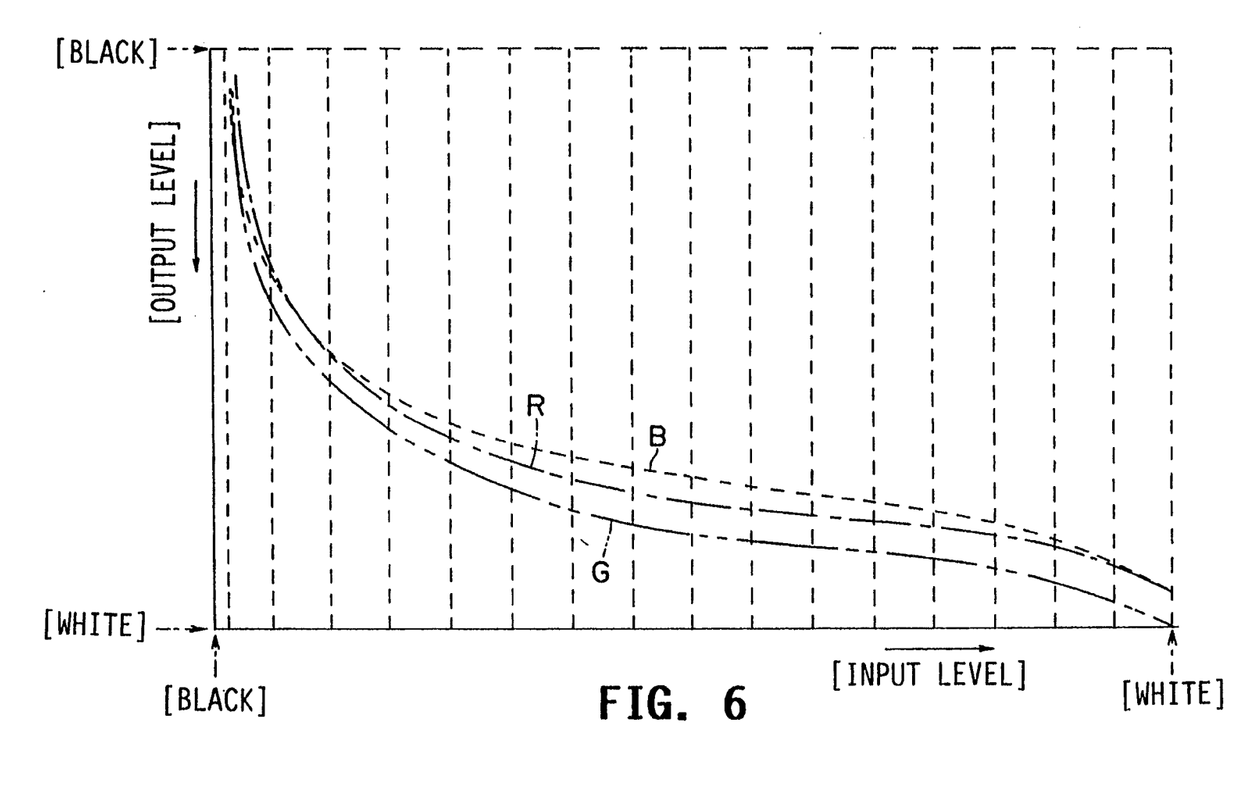
FIG. 6 is a characteristic curve diagram showing a gamma correction curve used in the gamma correction circuit that is part of the device of FIG. 3.

In this embodiment, due to the fact that the dynamic range from the black level to the white level in the video picture provided by the video camera 21 is narrower than the relevant dynamic range of the film, gamma correction is performed so as to expand the apparent dynamic range of gradation of the input picture data VD15 on the black level side and the white level side, by applying the correction characteristic curves shown in FIG. 6 (a red correction curve R, a green correction curve G, and a blue correction curve B) to the red component data VDR, the green component data VDG, and the blue component data VDB.

Figure 7:
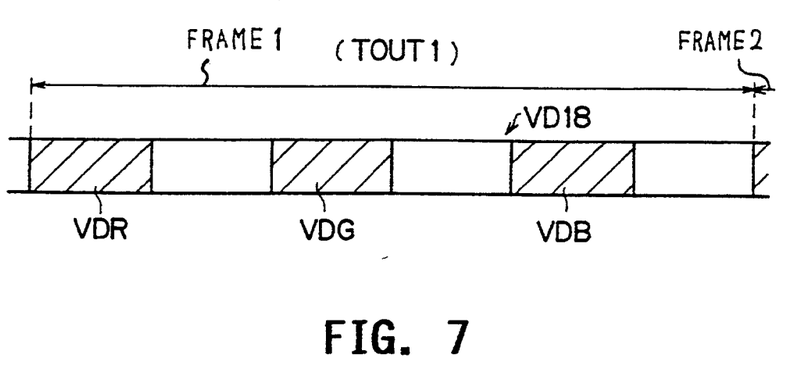
FIG. 7 is a schematic diagram illustrating the film recording data formed in the device of FIG. 3.

Picture data VD16 corrected to match the gamma characteristics of the film are temporarily stored in a frame memory 32. The red component data VDR, the green component data VDG, and the blue component data VDB are sequentially and intermittently read from a buffer circuit 33 each frame according to timings and clock rates corresponding to frame feeding operations of the film and deflection of the electron beam BM (FIG. 1). As illustrated in FIG. 7, film recording data VD18 are thereby obtained.

In this embodiment, the time TOUT1, during which the red component data VDR, the green component data VDG, and the blue component data VDB for each frame of picture data FRAME1, FRAME2, ... are respectively formed in three frame recording areas on the film 9, is set to one second. The red component data VDR, the green component data VDG and the blue component data VDB are sequentially and intermittently outputted within the period of one second.

Therefore, the red component data VDR, the green component data VDG, and the blue component data VDB are each outputted during approximately 0.15 second separated by intervals of approximately 0.15 second.

Thus, the film recording data VD18 is transmitted via a digital/analog converting circuit 34 to the EBR unit 15, whereby contrast pictures FR1, FG1, and FB1 (FIG. 2) for the respective color components are formed on the black-and-white film 9 (FIG. 1).

Simultaneously, a monitor circuit 35 is supplied with the film recording data VD18 from the buffer circuit 33, and the data are converted in the monitor circuit 35 into signals for displaying pictures equivalent to the pictures synthesized from the contrast pictures FR1, FG1, and FB1 for the respective color components formed on the black-and-white film 9.

Figure 8:
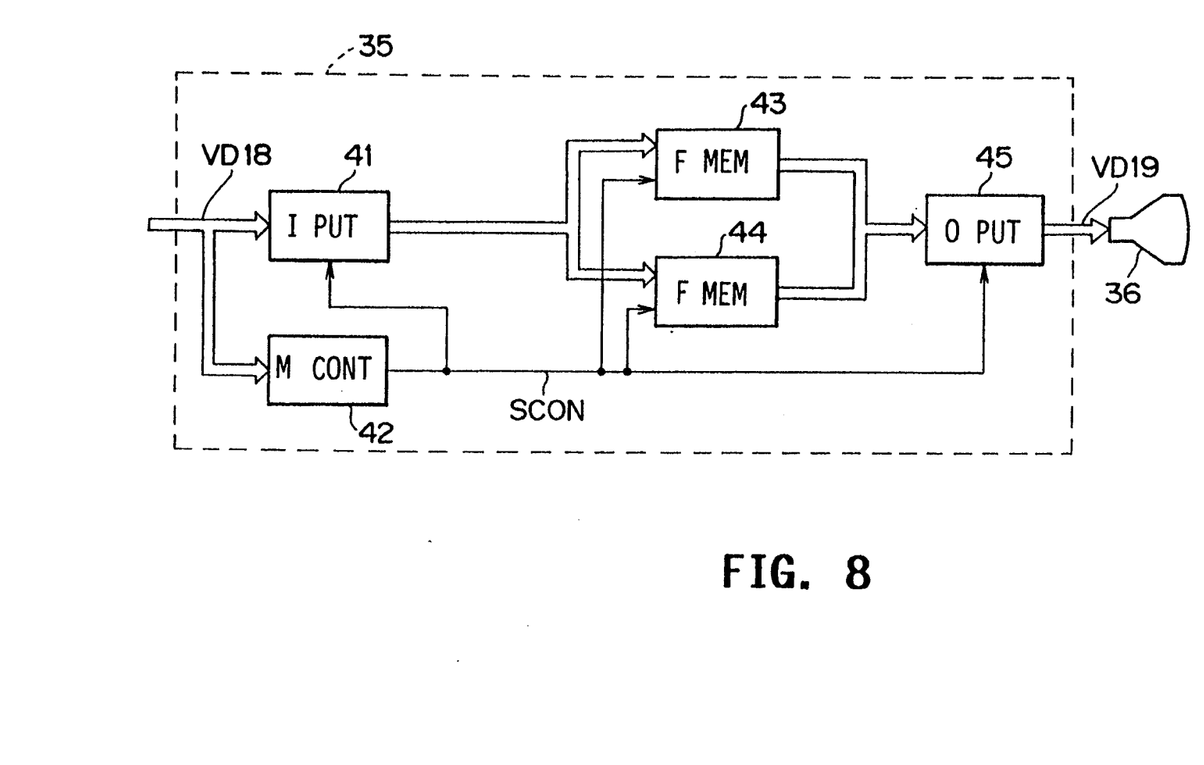
FIG. 8 is a block diagram illustrating the construction of a monitor circuit that is part of the device of FIG. 3.

More specifically, as depicted in FIG. 8, in the monitor circuit 35 the film recording data VD18 are supplied to an input circuit 41 and a memory control circuit 42.

The input circuit 42 performs series/parallel conversion of the film recording data VD18, thereby lowering the clock frequency to a rate that is appropriate for the TTL/MOS elements constituting the monitor circuit 35.

Further, the memory control circuit 42 outputs, as control signals SCON, transmission clock signal used for the serial/parallel conversion of the clock for the film recording data VD18, the write clock for storing the film recording data VD18 in the frame memories 43 and 44, the read clock for reading the stored data from the frame memories 43 and 44, the switching signals for switching between the frame memories 43 and 44, and the clock signals for performing the parallel/serial conversion in the output circuit 45.

The frame memory 43 comprises three frame memories adapted to store the three primary color signals VDR, VDG, and VDB transmitted as the film recording data VD18. Similarly, the frame memory 44 comprises three frame memories adapted to store the three primary color signals VDR, VDG, and VDB.

The frame memories 43 and 44 alternately store the film recording data VD18 for each frame based on the control signals SCON outputted from the memory control circuit 42.

To be specific, as illustrated in FIG. 9A to 9G, the three frame submemories 43R (FIG. 9B), 43G (FIG. 9C), and 43B (FIG. 9D) of the frame memory 43 for respectively storing the three primary color signals VD(Rx), VD(Gx), and VD(Bx) (corresponding to VDR, VDG, and VDB in FIG. 7) of the film recording data VD18 (FIG. 9A), are operated in the write mode by the control signals SCON at times within the period t1 to t2. The frame submemories sequentially store the primary color signals VD(R1), VD(G1), and VD(B1) for the first frame which is to be inputted.

Moreover, starting at time t2, when all the primary color signals VD(R1), VD(G1), and VD(B1) for the first frame are stored, the frame submemories 43R, 43G, and 43B are respectively operated in the read mode by the control signals SCON. At this point, the output circuit 45 repeatedly reads the respective primary color signals VD(R1), VD(G1), and VD(B1) for the first frame stored in the frame submemories 43R, 43G, and 43B at a rate of 1/30 second intervals based on the control signals SCON.

The frame submemories 44R (FIG. 9E), 44G (FIG. 9F), and 44B (FIG. 9G) of the second frame memory 44 are operated in the write mode by the control signals SCON at times within the period t3 to t4 during which the first frame submemories 43R, 43G, and 43B remain in the read mode. The frame submemories 44R, 44G, and 44B sequentially store respective primary color signals VD(R2), VD(G2), and VD(B2) for the second frame which are inputted after the respective primary color signals VD(R1), VD(G1), and VD(B1) for the first frame.

Further, starting at time t4 when all the primary color signals VD(R2), VD(G2), and VD(B2) for the second frame are stored, the frame submemories 44R, 44G, and 44B are respectively operated in the read mode by the control signals SCON. At this point, the output circuit 45 repeatedly reads the individual primary color signals VD(R2), VD(G2), and VD(B2) for the second frame stored in the frame submemories 44R, 44G, and 44B at the rate of 1/30 second intervals based on the control signals SCON.

Further, at times within the period t5 to t6 in which the frame submemories 44R, 44G and 44B are operated in the read mode, the first frame submemories 43R, 43G, and 43B are respectively operated in the write mode by the control signals SCON. These frame submemories sequentially store respective primary color signals VD(R3), VD(G3), and VD(B3) for the third frame which are inputted after the respective primary color signals VD(R2), VD(G2), and VD(B2) for the second frame.

In this way, the first and second frame memories 43 (43R, 43G, and 43B) and 44 (44R, 44G, and 44B) are respectively operated alternatively in the write and read modes. These memories alternately store the sequentially inputted primary color signals VD(R1), VD(G1), VD(B1); VD(R2), VD(G2), VD(B2); and VD(R3), VD(G3), VD(B3) . . . for each frame. Simultaneously, the frame memories 43 and 44 repeatedly read out the store frames of primary color signals VD(R1), VD(G1), VD(B1); VD(R2), VD(G2), VD(B2); and VD(R3), VD(G3), VD(B3) . . . at the rate of 1/30. At the same time, these signals undergo parallel/serial conversion in the output circuit 45 and the digital/analog conversion, thereby the monitor picture signals VD19 at a normal video signal frequency (i.e., the frequency of the video picture data VD11 from which the slow reproducing picture was formed).

Accordingly, the monitor picture signal VD19 is supplied to, and can be displayed by a CRT 36.

Figure 9A:
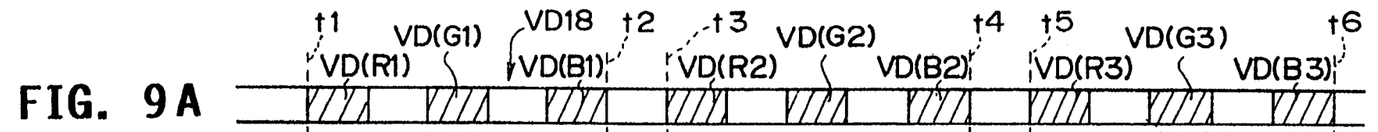
FIGS. 9A–9G are signal waveform diagrams used in explaining the operation of the monitor circuit of FIG. 8.
Figure 9B:
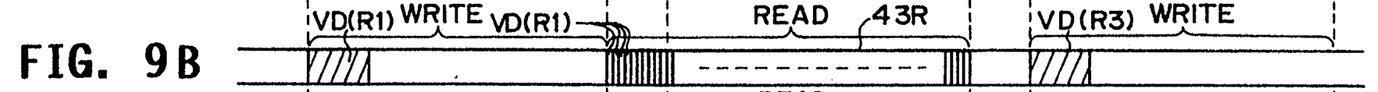
Figure 9C:
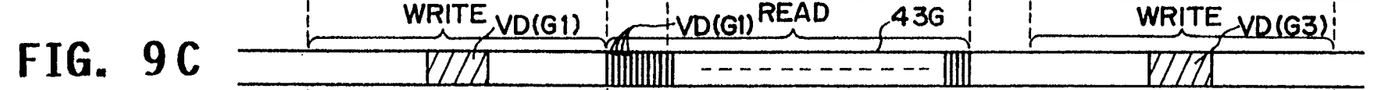
Figure 9D:
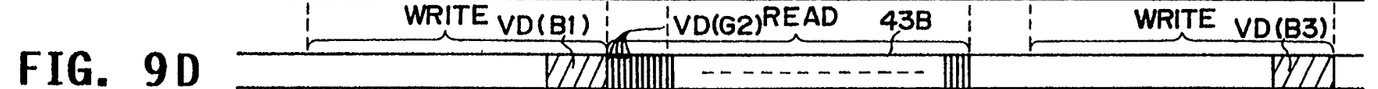
Figure 9E:
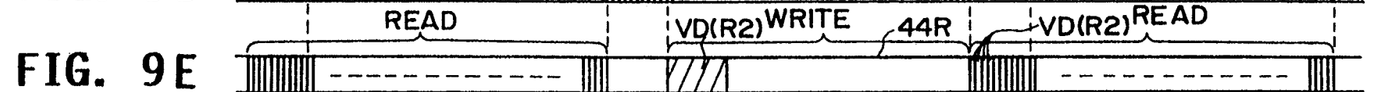
Figure 9F:
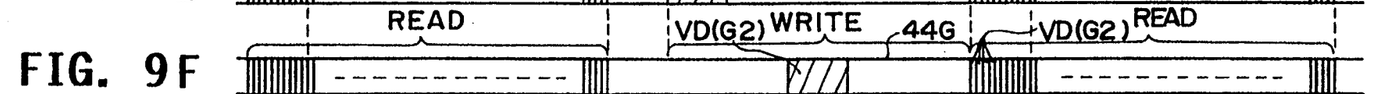
Figure 9G:
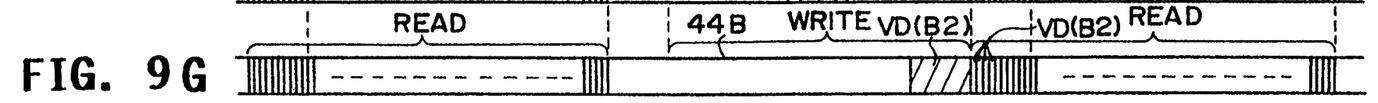

Upon reaching the time t2 at which all the primary color signals VD(R1), VD(G1), and VD(B1) for the first frame of the film recording data VD18 are stored in the frame memory 43, the memory control circuit 42 performs operations to repeatedly read the frame of picture data consisting of the primary color signals VD(R1), VD(G1), and VD(B1) from the frame memory 43. Upon reaching the time t4 at which all the primary color signals VD(R2), VD(G2), and VD(B2) for the second frame of the film recording data VD18 are stored in the frame memory 44, the memory control circuit 42 repeatedly reads the frame of picture data consisting of the primary color signals VD(R2), VD(G2), and VD(B2) from the frame memory 44, having switched over from memory 43 to frame memory 44. In the monitor picture signals VD19, during the period t2 to t4 (approximately 1 second), synthetic color picture signals are repeatedly formed based on the primary color signals VD(R1), VD(G1), and VD(B1) for the first frame of the film recording data VD18. Also, during the period t4 to t6 (approximately 1 second), synthetic color picture signals are repeatedly formed based on the primary color signals VD(R2), VD(G2), and BD(B2) for the second frame of the film recording data VD18.

Thus, in the period t2 to t4, the synthetic color picture corresponding to the primary color signals VD(R1), VD(G1), and VD(B1) for the first frame of the film recording data VD18 is displayed as a still picture on the display screen of the CRT 36. And in the period t4 to t6, the synthetic color picture corresponding to the primary color signals VD(R2), VD(G2), and VD(B2) is displayed as a still picture. Thereafter, still pictures for each frame are sequentially displayed, thereby providing slow reproducing pictures in which a scene proceeds at intervals of one second.

The timing at which the frame memories 43 and 44 are changed over is set within the film feed time during which the black-and-white film 9 is fed for each one frame unit and further, is set within the perpendicular blanking interval of the monitor picture signal VD19. The picture signals outputted alternatively from the first frame memory 43 and the second frame memory 44 can thereby be smoothly linked.

In addition, the monitor picture signals VD19 are inputted to the CRT 36 in synchronization with the film recording data VD18 recorded on the black-and-white film 9. It is therefore possible to display on the CRT 36, in real time, the film recording data VD18 actually as recorded on the black-and-white film 9 (FIG. 2).

In the embodiment described above, the picture signal converting apparatus 20 carried out the gamma correction in the film gamma correcting circuit 31. Changes in the saturation, the chrominance and the luminance of the color components during gama correction are avoided by previous selective correction of a respective color component.

Various color and correcting data are previously provided by the color circuits determination circuits 28RA, 28GA and 28BA and the correction data generation circuits 28RB, 28GB and 28BB. Proper correction processing can accordingly be performed in response to the color of the input picture data.

It is therefore possible to selectively color correct the color as to which the human visual system is the most sensitive in detecting aberrations.

According to the embodiment described above, it is possible to perform appropriate color correction by selectively color correcting depending on the color of the input signal and previously established color correction values.

In the embodiment described above, the color correction circuit 28 is provided upstream from the film gamma correction circuit 31. The present invention is not limited to this arrangement; the color correction circuit may be provided downstream from the film gamma correction circuit 31.

In this case, the color correction data may be added on the basis of the color as it is determined to have actually changed during gamma correction.

Also in the embodiment described above, monochrome colors are corrected. The present invention is not so limited, but may be used to correct categories of colors.

Further, in the embodiment described above, the picture signal converting apparatus 20 includes a linearizer 26 which restores the original gamma characteristic of the picture data which had been gamma corrected by the video camera. The picture data is then corrected to have characteristics corresponding to the gamma characteristics of the film by the film gamma correction circuit 31 so that correction only for the film gamma characteristics can be separately performed without regard to the gamma characteristics of the camera.

Therefore, when the video camera 21 is replaced, the correction characteristics of the linearizer 26 are changed accordingly. When the film is changed, the correction characteristics of the film gamma correction circuit 31 are changed accordingly. This makes it possible to facilitate the establishment of the optimum correction conditions corresponding to the video camera 21 and the film as actually used.

According to the embodiment described above, separate gamma correction is carried out in regard to the video camera 21 and the film respectively, and the data corresponding to the condition of the video camera 21 and the film each can be selected separately. When one of the video camera 21 and the film is changed, it is possible to change only the gamma characteristics for the one that was changed. This makes it possible to improve the operational efficiency of the gamma correction.

As a result, it is also possible to have increased flexibility in selecting the video camera 21 and the film.

Incidentally, since the camera gamma characteristics of the picture data are compensated for upstream from the color correction circuit 28, it is possible to color correct on the basis of the film characteristics alone, and without regard to the effect of the camera gamma characteristics.

In the embodiment described above, in the gamma correction circuit 31, the correction characteristics as illustrated in FIG. 6 are used. The present invention is not so limited as various film gamma characteristics may be selected. Moreover, it is possible to select various gamma characteristics other than film gamma characteristics.

In the above discussed embodiment, during the picture signal converting process, the picture signal converting device 20 is capable of displaying the contrast pictures corresponding to the respective primary color signals recorded on the black-and-white film 9, on the display screen of the CRT 36, in the form of a color picture synthesized from the respective primary color pictures.

Thus, the color picture undergoing color correction, gamma correction, etc., within the picture signal converting circuit unit 24 can be directly observed on the display. It is therefore possible to monitor whether or not signal processing is being performed properly and confirm whether or not the picture converting device 20 is operating normally.

Accordingly, even when the color correction and the gamma correction are changed in individual cuts and scenes, the degree of correction is adjustable while confirming on the display screen, that the picture has been changed as desired due to the correction.

Besides, when editing, a desired scene can be selected from the video picture data VD12 while viewing the display screen of the CRT 36. This makes it possible to facilitate editing operations.

In the above embodiment, the conversion process can be monitored as it is carried out thereby improving the efficiency of the process.

Note that the embodiment described above has dealt with the case where the time for recording each frame on the black-and-white film 9 is set to one second. The present invention is not, however, so limited but may be used at other frame recording rates.

The embodiment discussed above has dealt with the case where two frame memories 43 and 44 are employed. The number of the frame memories is not, however, limited to two. What is important is that a plurality of frame memories is employed.

The embodiment given above has dealt with the case where the film recording data VD18 is formed at the frequency of 59.4 MHZ. The present invention is not, however, limited to this frequency. The data may be formed at a variety of frequencies.

While the preferred embodiments of the invention have been described herein, it will be obvious to those skilled in the art that various changes and modifications may be made therein without departing from the invention, and it is intended, therefore, to cover in the appended claims all such changes and modifications as fall within the true spirit and scope of the invention.

What is claimed is:

1. An apparatus for converting an input video signal having a nominal transmission speed into a motion picture film image, the apparatus comprising:
    means for receiving said input video signal at said nominal transmission speed, converting said transmission speed of said video signal to a low speed that is lower than said nominal transmission speed, and transmitting said video signal at said low speed;
    color detecting means receiving said video signal transmitted at said low speed for detecting a color characteristic of said transmitted video signal and producing a detection signal on the basis of said detected color characteristic;
    color correcting means responsive to said video signal transmitted at said low speed and said detection signal for predicting a gamma correction to be performed, and for performing a color correction on said transmitted video signal in accordance with said detection signal and the predicted gamma correction so as to output a color corrected video signal;
    gamma correcting means for performing gamma correction on said color corrected video signal on the basis of a gamma correction curve to form a gamma corrected signal; and
    recording means for recording the gamma corrected signal formed by the gamma correcting means on motion picture film.

2. The apparatus according to claim 1, further comprising means for separating said video signal transmitted at said low speed into red, green and blue signals, and wherein said color detecting means outputs first, second and third detection signals on the basis of said detected color characteristic and said correcting means includes first, second and third means for respectively receiving and correcting said red, green and blue signals on the basis of said first, second and third detection signals, respectively.

3. The apparatus according to claim 2, wherein if said detection means determines that the transmitted video signal is a red monochrome, said first means amplifies said red signal, if said detection means determines that the transmitted video signal is green monochrome, said second means amplifies said green signal, and if said detection means determines that the transmitted video signal is a blue monochrome, said third means amplifies said blue signal.

4. An apparatus for converting into a motion picture film image an input video signal having a nominal transmission speed and which is provided from a video camera having performed gamma correction on said input video signal by means of a non-linear amplifier, the apparatus comprising:
    means for receiving said input video signal at said nominal transmission speed, converting said transmission speed of said video signal to a low speed that is lower than said nominal transmission speed, and transmitting said video signal at said low speed;
    linearizing means receiving said video signal transmitted at said low speed for linearizing said transmitted video signal so as to reverse said gamma correction performed by said video camera;
    gamma correcting means for correcting said linearized video signal on the basis of a gamma correction curve to form a gamma corrected signal; and
    recording means for recording the gamma corrected signal formed by the gamma correcting means on motion picture film.

5. The apparatus according to claim 4, further comprising means for storing plural predetermined gamma correction curves and means for selecting one of said stored gamma correction curves to be the basis of the gamma correction performed by said gamma correcting means.

6. The apparatus according to claim 4, further comprising means for storing plural predetermined sets of data representative of linearizing curves and means for selecting one of said stored sets of data for use by said linearizing means in linearizing said transmitted video signal, said one of said stored sets of data being selected according to a characteristic of the gamma correction performed by said video camera.

7. An apparatus for converting an input video signal having a nominal transmission speed into a motion picture film image, the apparatus comprising:
    means for receiving said input video signal at said nominal transmission speed, converting said nominal transmission speed of said video signal to a low speed that is lower than said nominal transmission speed, and transmitting said video signal at said low speed, said nominal transmission speed being a predetermined number of times as fast as said low speed;
    processing means receiving said video signal transmitted at said low speed for processing said transmitted video signal to form an output video signal;
    recording means for recording the output video signal formed by the processing means on motion picture film;
    memory means for storing successive frames of said output video signal at said low speed, said memory means having first and second memory areas, and alternate ones of said successive frames being respectively stored in said first and second memory areas;
    read-out control means for controlling reading-out of said stored frames of said output video signal from said memory means so that said stored frames are read-out in a cycle in which each respective frame stored in said first and second memory areas is read-out N consecutive times at said nominal transmission speed, N being equal to said predetermined number; and
    a monitor for displaying said frames of said output video signal read-out from said memory means.

8. The apparatus according to claim 7, wherein said processing means includes means for separating said video signal transmitted at said low speed into red, green and blue signals, said processing means processing each of said red, green and blue signals separately, and wherein said first and second memory areas store each of said red, green and blue signals separately, and said read-out control means controls the reading-out of said frames of said output video signal so that the respective red, green and blue signals of each frame are read-out simultaneously.

* * * * *